United States Patent
Hiranuma et al.

(10) Patent No.: US 11,196,356 B2
(45) Date of Patent: Dec. 7, 2021

(54) POWER CONVERSION DEVICE

(71) Applicant: Hitachi Automotive Systems, Ltd., Hitachinaka (JP)

(72) Inventors: Satoshi Hiranuma, Hitachinaka (JP); Kouichi Yahata, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 0 days.

(21) Appl. No.: 16/970,007

(22) PCT Filed: Jan. 15, 2019

(86) PCT No.: PCT/JP2019/000828
§ 371 (c)(1),
(2) Date: Aug. 14, 2020

(87) PCT Pub. No.: WO2019/159580
PCT Pub. Date: Aug. 22, 2019

(65) Prior Publication Data
US 2021/0104958 A1    Apr. 8, 2021

(30) Foreign Application Priority Data

Feb. 15, 2018 (JP) .............................. JP2018-025497

(51) Int. Cl.
*H02M 7/5387* (2007.01)
*H02M 1/32* (2007.01)
(Continued)

(52) U.S. Cl.
CPC ......... *H02M 7/53873* (2013.01); *H02M 1/32* (2013.01); *H02P 27/08* (2013.01); *H02M 1/0003* (2021.05); *H02M 1/322* (2021.05)

(58) Field of Classification Search
CPC .... H02M 7/53873; H02M 1/32; H02M 1/322; H02M 1/003; H02P 27/08
See application file for complete search history.

(56) References Cited

U.S. PATENT DOCUMENTS 5,465,202 A    11/1995  Ibori et al.
2013/0033914 A1    2/2013  Yahata et al.
(Continued)

FOREIGN PATENT DOCUMENTS

JP    4-207986 A    7/1992
JP    2011-234507 A    11/2011
(Continued)

OTHER PUBLICATIONS

International Search Report (PCT/ISA/210) issued in PCT Application No. PCT/JP2019/000828 dated Apr. 23, 2019 with English translation (four (4) pages).
(Continued)

*Primary Examiner* — Adolf D Berhane
(74) *Attorney, Agent, or Firm* — Crowell & Moring LLP

(57) ABSTRACT

An object of the present invention is to provide a power conversion device capable of reliably discharging a voltage smoothing capacitor even when a circuit unit that outputs a discharge control signal fails. The power conversion device includes a voltage smoothing capacitor that is electrically connected in parallel with an inverter circuit unit, a discharge resistor that is electrically connected in parallel with the voltage smoothing capacitor, a switching element that is connected in series with the discharge resistor, a motor controller that selectively outputs a High-level signal and a Low-level signal as a discharge control signal, a switching signal circuit unit that outputs a rectangular wave signal having a predetermined duty, and a logic circuit that outputs any one of a rectangular wave signal having the same duty as the duty of the rectangular wave signal and a rectangular wave signal having a duty to the switching element based on the discharge control signal and the rectangular wave signal.

7 Claims, 12 Drawing Sheets

(51) Int. Cl.
*H02P 27/08* (2006.01)
*H02M 1/00* (2006.01)

(56) References Cited

U.S. PATENT DOCUMENTS

| | | |
|---|---|---|
| 2013/0181686 A1 | 7/2013 | Ueda |
| 2013/0234510 A1 | 9/2013 | Nakamura |
| 2014/0095005 A1 | 4/2014 | Kanzaki et al. |
| 2015/0015248 A1* | 1/2015 | Seo ................... G01R 15/245 324/244.1 |
| 2016/0248347 A1* | 8/2016 | Shinohara ................ H02P 3/12 |
| 2019/0238063 A1* | 8/2019 | Irie ........................ H02M 1/12 |
| 2020/0389118 A1* | 12/2020 | Kashihara ......... H02M 7/53873 |
| 2021/0036645 A1* | 2/2021 | Yokoyama ............. H02P 21/22 |

FOREIGN PATENT DOCUMENTS

| | | |
|---|---|---|
| JP | 2013-145970 A | 7/2013 |
| JP | 2013-188092 A | 9/2013 |
| JP | 2015-116097 A | 6/2015 |
| JP | 2017-28873 A | 2/2017 |
| WO | WO 2012/164680 A1 | 12/2012 |

OTHER PUBLICATIONS

Japanese-language Written Opinion (PCT/ISA/237) issued in PCT Application No. PCT/JP2019/000828 dated Apr. 23, 2019 (four (4) pages).

* cited by examiner

FIG. 3

TRUE TABLE A

| IN_A | H | H | L | L |
|---|---|---|---|---|
| IN_B | H | L | H | L |
| OUT | L | H | H | L |

TRUE TABLE B

|  | HI-Z | HI-Z | Low FIXATION | Low FIXATION | High FIXATION | High FIXATION |
|---|---|---|---|---|---|---|
| IN_A | H | H | L | L | H | H |
| IN_B | H | L | H | L | H | L |
| OUT | L | H | H | L | L | H |

POWER CONVERSION DEVICE

TECHNICAL FIELD

The present invention relates to a power conversion device.

BACKGROUND ART

In the related art, for example, a technology described in PTL 1 is known as a technology for discharging residual electric charges accumulated in a capacitor at the time of stopping output control in a power conversion device. In the technology described in PTL 1, the electric charges of the capacitor are discharged by turning on and off a switching element disposed in parallel with the capacitor by a controller.

CITATION LIST

Patent Literature

PTL 1: JP 2017-028873 A

SUMMARY OF INVENTION

Technical Problem

However, according to the technology described in PTL 1, when a failure occurs in the controller, the switching element cannot be normally controlled, and the electric charges of the capacitor may not be discharged.

Solution to Problem

According to one aspect of the present invention, a power conversion device includes an inverter circuit unit that performs conversion between a DC power and an AC power, a smoothing capacitor that is electrically connected in parallel to the inverter circuit unit, a discharge resistor element that is electrically connected in parallel to the smoothing capacitor, a switching element that is connected in series with the discharge resistor element to turn on and off a discharge current flowing through the discharge resistor element, a controller circuit unit that selectively outputs a High-level signal and a Low-level signal as a discharge control signal instructing that discharge using the discharge resistor element is performed, a signal generation circuit that outputs a first rectangular wave signal having a predetermined duty D, and a logic circuit that outputs, as an on and off control signal, any one of a second rectangular wave signal having the same duty as the duty of the first rectangular wave signal and a third rectangular wave signal having a duty (1-D) to the switching element.

Advantageous Effects of Invention

According to this invention, even when a circuit unit that outputs a discharge control signal fails, discharge of a voltage smoothing capacitor can be reliably performed.

BRIEF DESCRIPTION OF DRAWINGS

FIG. 3 is a diagram illustrating truth tables when exclusive OR is used for a logic circuit.

DESCRIPTION OF EMBODIMENTS

Figure 1:
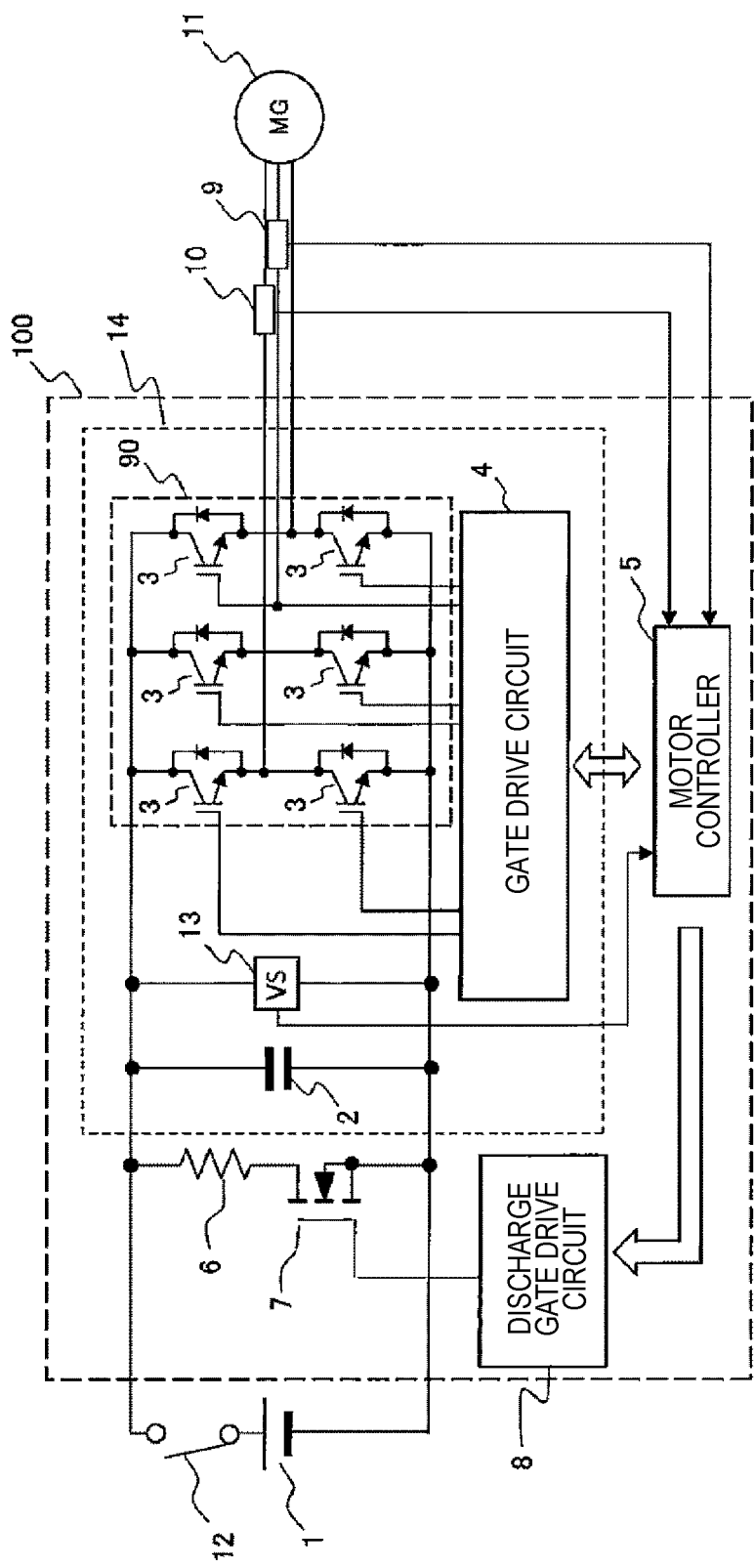
FIG. 1 is a diagram illustrating an embodiment of a power conversion device.

Hereinafter, embodiments for carrying out the present invention will be described with reference to the accompanying drawings. FIG. 1 is a diagram illustrating an embodiment of a power conversion device. A power conversion device 100 illustrated in FIG. 1 includes a three-phase inverter device 14 for driving a motor, and converts a DC power of a DC battery 1 into an AC power for driving a motor 11. At the time of regeneration, the motor 11 is driven as a generator, and the DC battery 1 is charged with a regenerative power. The three-phase inverter device 14 for driving a motor includes an inverter circuit unit 90 having a plurality of switching elements 3, a gate drive circuit 4 for driving the switching elements 3, a voltage smoothing capacitor 2, and a voltage measurement circuit 13. A contactor 12 that controls connection and disconnection between the three-phase inverter device 14 and the DC battery 1 is provided.

A motor controller 5 feeds back an energization current value of the motor 11 detected by current sensors 9 and 10, and outputs a motor PWM signal for controlling the motor 11 to desired torque and rotation speed to the gate drive circuit 4. The gate drive circuit 4 controls the switching element 3 based on the motor PWM signal from the motor controller 5. The voltage smoothing capacitor 2 smooths an applied voltage that fluctuates at the time of power conversion. A series circuit of a discharge resistor 6 and a switching element 7 for discharge control is connected in parallel with the voltage smoothing capacitor 2.

The motor controller 5 performs discharge control of the power accumulated in the voltage smoothing capacitor 2. The voltage measurement circuit 13 measures a voltage Vc of the voltage smoothing capacitor 2. The motor controller 5 outputs a discharge control signal to a discharge gate drive circuit 8, and performs control such that the switching element 7 is turned on and off according to a discharge switching signal output from the discharge gate drive circuit 8 as will be described below. As a result, the power accumulated in the voltage smoothing capacitor 2 is consumed by the discharge resistor 6.

Figure 2:
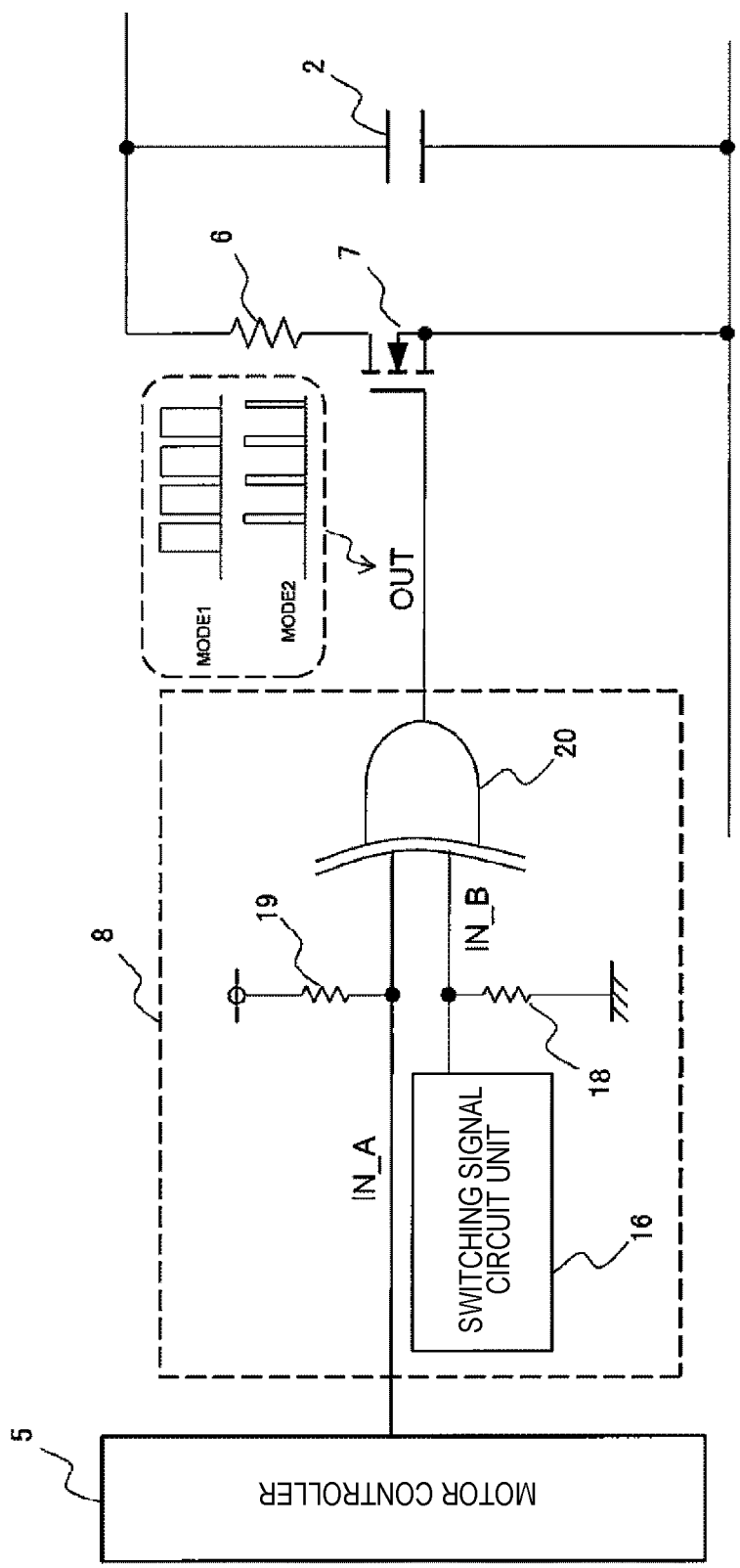
FIG. 2 is a diagram for describing details of a discharge gate drive circuit.

FIG. 2 is a diagram for describing details of the discharge gate drive circuit 8. The discharge gate drive circuit 8 includes a switching signal circuit unit 16, a pull-down resistor 18, a pull-up resistor 19, and a logic circuit 20. A discharge control signal IN_A is input to the logic circuit 20 from the motor controller 5. The discharge control signal IN_A is a signal for instructing which of two types of discharge switching signals (MODE1 rectangular wave signal and MODE2 rectangular wave signal) is to perform discharge, and has two voltage levels of High and Low. A Low signal is output as the discharge control signal IN_A when discharge control using the MODE1 rectangular wave signal is performed, and a High signal is output as the discharge control signal IN_A when discharge control using the MODE2 rectangular wave signal is performed. The pull-up resistor 19 is connected to a signal line of the discharge control signal IN_A.

The switching signal circuit unit 16 is a circuit that generates a rectangular wave signal IN_B, and the generated rectangular wave signal IN_B is input to the logic circuit 20. The detailed configuration of the switching signal circuit unit 16 will be described below. The pull-down resistor 18 is connected to a signal line of the rectangular wave signal IN_B. Any one of the MODE1 rectangular wave signal and the MODE2 rectangular wave signal has the same duty as that of the rectangular wave signal IN_B. Hereinafter, a case where the duty of the rectangular wave signal IN_B and the duty of the MODE1 rectangular wave signal are the same will be described as an example.

The logic circuit 20 receives the discharge control signal IN_A and the rectangular wave signal IN_B, and outputs any one of the MODE1 rectangular wave signal and the MODE2 rectangular wave signal. Here, a case where the logic circuit 20 is a circuit using exclusive OR will be described as an example. FIG. 3 illustrates truth tables when the exclusive OR is used, in which a truth table A is a truth table of the signals IN_A and IN_B and a truth table B is a truth table corresponding to a failure state of the motor controller 5. According to the truth table A, when the discharge control signal IN_A is High, an output signal OUT of the logic circuit 20 is an inversion signal of the square wave signal IN_B, and when the discharge control signal IN_A is Low, the output signal OUT is the rectangular wave signal IN_B.

Meanwhile, as illustrated in the truth table B, a High fixation in which the High signal is output, a Low fixation in which the Low signal is output, or a high impedance (referred to as a HI-Z state) in which any signal is not output are considered as the failure state of the motor controller 5. In the Hi-Z state, the signal which is pulled up by the pull-up resistor 19 and is input as the discharge control signal IN_A to the logic circuit 20 becomes High.

When the failure state of the motor controller 5 is the HI-Z state, the output signal OUT output from the logic circuit 20 is the MODE2 rectangular wave signal. When the duty of the rectangular wave signal IN_B output from the switching signal circuit unit 16 is D, the MODE2 rectangular wave signal is a rectangular wave signal having a duty (1-D). The same applies to a case where the failure state is the High fixation, and the output signal OUT is the MODE2 rectangular wave signal. Meanwhile, when the failure state is the Low fixation, the output signal OUT output from the logic circuit 20 is a rectangular wave signal (hereinafter, referred to as a MODE1 rectangular wave signal) having the same duty D as that of the rectangular wave signal IN_B.

As described above, in the present embodiment, the power conversion device 100 includes the inverter circuit portion 90 that performs conversion between the DC power and the AC power, the voltage smoothing device 2 that is electrically connected in parallel with the inverter circuit unit 90, the discharge resistor 6 that is electrically connected in parallel with the voltage smoothing capacitor 2, the switching element 7 that is connected in series with the discharge resistor 6 and turns on and off a discharge current flowing through the discharge resistor 6, the motor controller 5 that selectively outputs the High-level signal and the Low-level signal as the discharge control signal IN_A for instructing that the discharge using the discharge resistor 6 is performed, the switching signal circuit unit 16 that outputs the rectangular wave signal IN_B having the predetermined duty D, and the logic circuit 20 that outputs, as an on and off control signal, any one of the MODE1 rectangular wave signal having the same duty D as that of the rectangular wave signal IN_B and the MODE2 rectangular wave signal having the duty (1-D) based on the discharge control signal IN_A and the rectangular wave signal IN_B to the switching element 7.

When the motor controller 5 fails, since the failure state (High fixation, Low fixation, and HI-Z state) becomes the same signal state as that of the High signal or the Low signal, the MODE1 rectangular wave signal or the MODE2 rectangular wave signal is output from the logic circuit 20 irrespective of the failure state. Therefore, even though the failure of the motor controller 5 is any failure state, electric charges accumulated in the voltage smoothing capacitor 2 can be discharged.

Figure 4:
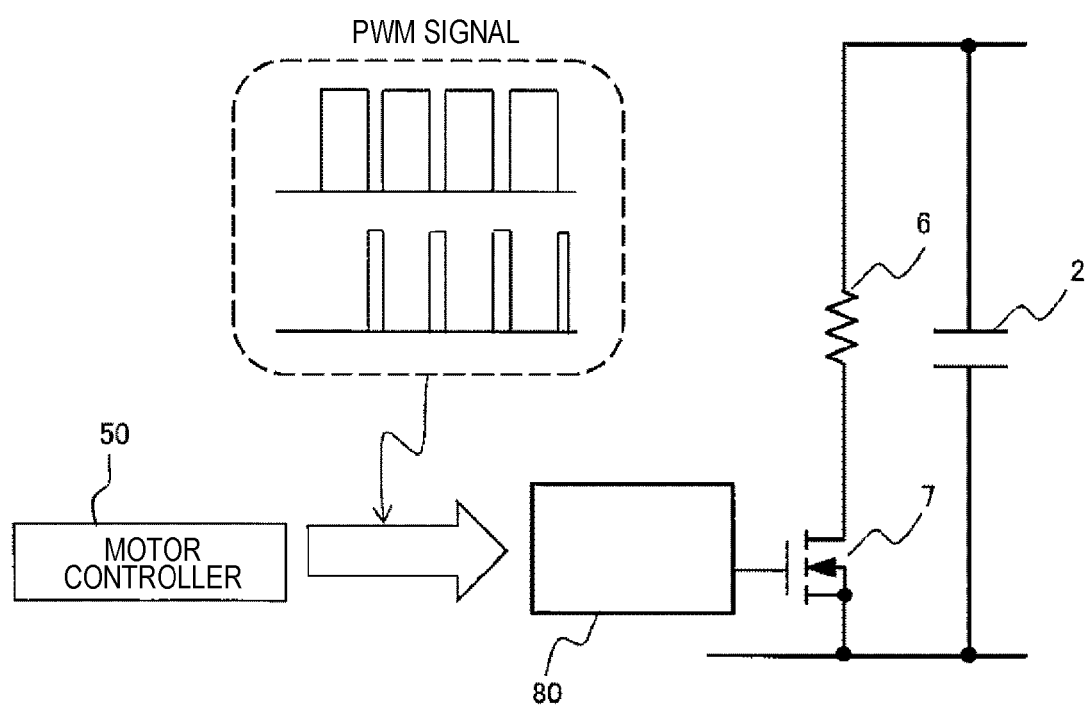
FIG. 4 is a diagram for describing a discharge control method of the related art.

FIG. 4 is a diagram for describing a discharge control method of the related art. The motor controller 50 outputs a PWM signal for turning on and off the switching element 7. A discharge gate drive circuit 80 outputs a gate drive signal (that is, a switching signal) based on the input PWM signal to the switching element 7. Therefore, when the motor controller 50 fails and enters any failure state of the HI-Z state, the High fixation, and the Low fixation as described above, an on and off control similar to a switching control based on the PWM signal cannot be performed on the switching element 7, and an appropriate discharge control cannot be performed at the time of failure. For example, there is a problem that the voltage smoothing capacitor 2 cannot be discharged when the motor controller enters the failure state of the Low fixation.

Figure 5:
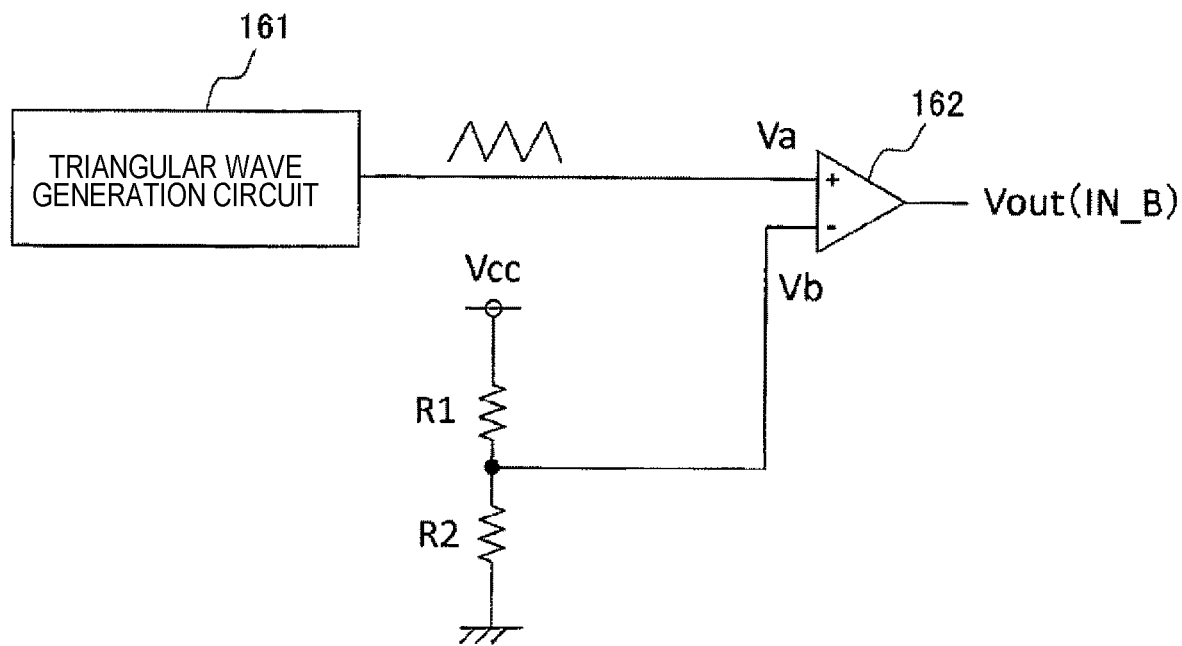
FIG. 5 is a diagram illustrating an example of a switching signal circuit unit.

The present embodiment is characterized in that the switching signal circuit unit 16 that generates the MODE1 rectangular wave signal or the MODE2 rectangular wave signal is constituted by hardware different from the motor controller 5, as illustrated in FIG. 2. FIG. 5 is a diagram illustrating an example of the switching signal circuit unit 16. The switching signal circuit unit 16 includes a triangular wave generation circuit 161 and a comparator 162. A triangular wave signal Va from the triangular wave generation circuit 161 is input to a non-inverting input terminal of the comparator 162, and a voltage Vb obtained by dividing a voltage Vcc by resistors R1 and R2 is input to the inverting input terminal. An output Vout (that is, the rectangular wave signal IN_B) of the comparator 162 becomes the High level when Va≥Vb, and becomes the Low level when Va<Vb.

Figure 6A:
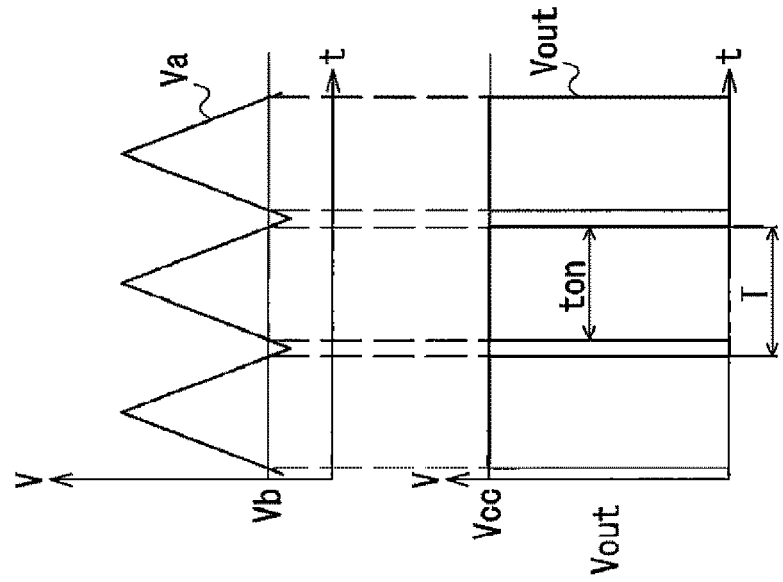
FIGS. 6A and 6B are diagrams for describing signal waveforms in the switching signal circuit unit.
Figure 6B:
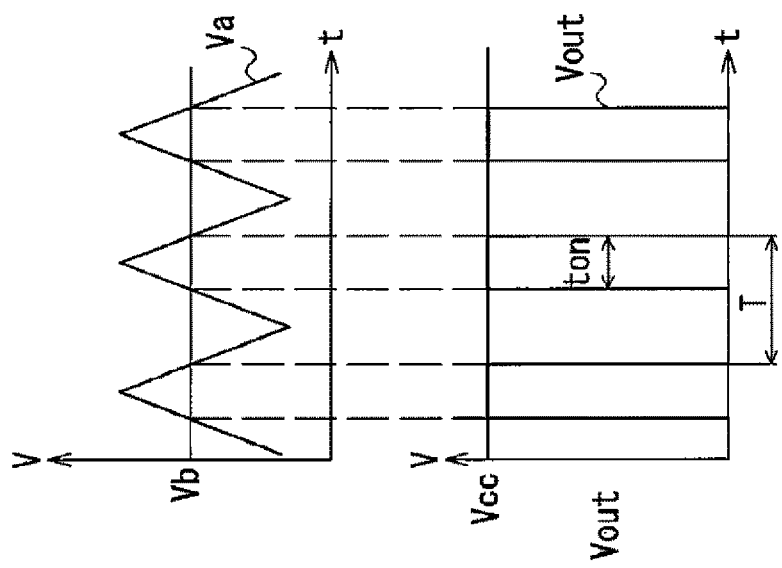

FIG. 6 is a diagram illustrating waveforms of the triangular wave signal Va, the voltage Vb, and the output Vout. When the voltage Vb is increased as illustrated in FIG. 6(a), the duty (=ton/T) of the output Vout is decreased, and when the voltage Vb is decreased as illustrated in FIG. 6(b), the duty of the output Vout is increased. The voltage Vb can be changed, for example, by changing a value of the resistor R2.

Next, an operation of the MODE1 rectangular wave signal and the MODE2 rectangular wave signal in a discharge operation will be described. As illustrated in FIG. 6, the MODE1 rectangular wave signal and the MODE2 rectangular wave signal which are the output signals OUT can be variously set by setting the duty of the rectangular wave signal IN_B (that is, the MODE1 rectangular wave signal) generated by the switching signal circuit unit 16. Here, a rapid type and a balanced type for a discharge speed will be described.

(Rapid Type)

In the rapid type, the duty of the MODE1 rectangular wave signal is set such that the electric charges accumulated in the voltage smoothing capacitor 2 can be rapidly discharged by the discharge using the MODE1 rectangular wave signal. In the rapid type, the duty of the MODE1 rectangular wave signal is set as large as about 90%. For example, when the duty of the MODE1 rectangular wave signal is set to 95%, the duty of the MODE2 rectangular wave signal which is the inversion signal of the MODE1 rectangular wave signal becomes 5%.

Figure 7:
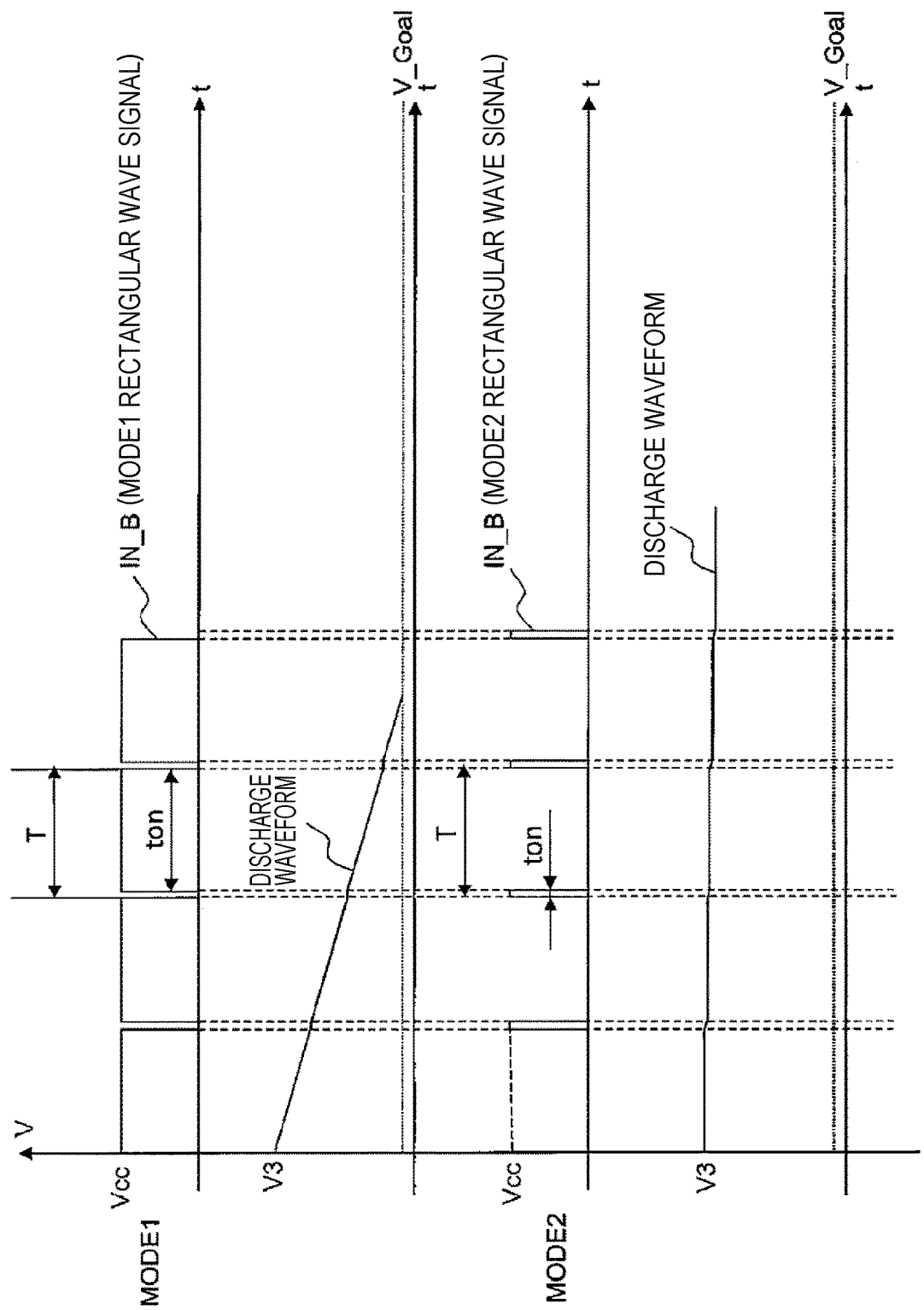
FIG. 7 is a diagram for describing MODE1 and MODE2.

FIG. 7 is a diagram for describing discharge using the MODE1 rectangular wave signal (indicated by MODE1) and discharge using the MODE2 rectangular wave signal (indicated by MODE2). Since the discharge is performed when the rectangular wave signal is at the High level, a time until the voltage of the voltage smoothing capacitor 2 reaches a safe voltage Vgoal is much shorter than a time in the MODE1. For example, when it is necessary to rapidly terminate the discharge such as discharge at the time of turning off a key of the vehicle, the discharge of the MODE1 is used.

Meanwhile, in the case of the discharge using the MODE2 rectangular wave signal of the MODE2, since the duty of the MODE2 rectangular wave signal is small, a discharge amount per one cycle of the rectangular wave signal is very small, and a time (discharge end time) until the voltage of the voltage smoothing capacitor reaches the voltage Vgoal is long. However, there are the following advantages when such discharge is used for discharge at the time of regeneration, for example. When the voltage smoothing capacitor 2 is almost fully charged at the time of regeneration, a power is consumed by the discharge resistor 6 to prevent an overvoltage state. In this case, in a case where the discharge of the MODE2 using the MODE2 rectangular wave signal is performed, since the power consumed by the discharge is smaller than in the case of the MODE1, wasteful power consumption can be reduced.

However, when the rapid type pattern is operated and the discharge using the MODE2 rectangular wave signal is performed as in the case of the High fixation of FIG. 3 during the controller failure, a time until the discharge ends becomes long. Therefore, when the discharge in the MODE2 in which the MODE2 rectangular wave signal is output from the logic circuit 20 is performed, it is preferable that the motor controller 5 performs discharge using a winding of the motor 11. Accordingly, the discharge end time in the case of the discharge in the MODE2 can be shortened. In this case, the motor controller 5 operates the switching element 3 provided in the inverter circuit unit 90 such that the power of the voltage smoothing capacitor 2 is consumed by the motor winding.

(Balanced Type)

The balanced type is a setting in which the duty of the MODE1 rectangular wave signal is set to about 60% and there is no large difference in the discharge end time in both the MODE1 and the MODE2. The feature of the balanced type is that when the motor controller 5 fails, since there is no large difference in the discharge end time even though the discharge is performed in the MODE1 or the MODE2, a risk of secondary disaster due to electric shock can be reduced.

A specific discharge time when the discharge is performed in the MODE1 and the MODE2 will be described. Here, a capacitance of the voltage smoothing capacitor 2 to be discharged is C, a discharge start voltage is V1, a discharge end voltage is V2 (corresponding to Vgoal of FIG. 3), and a resistance value of the discharge resistor 6 is R. A discharge end time t0 when the discharge is performed at a constant resistance R is expressed by the following Equation (1). At this time, a discharge end time t1 in the MODE1 is expressed by Equation (2), and a discharge end time t2 in the MODE2 is expressed by Equation (3).

$$t0=-RC \times ln(V2/V1) \qquad (1)$$

$$t1=t0/(ton/T) \qquad (2)$$

$$t2=t0/\{(T-ton)/T\} \qquad (3)$$

In the case of a setting that emphasizes rapid discharge, the duty is decided such that the discharge end time t1 calculated by Equation (2) becomes a required time, and the operation is performed in the rapid type. Meanwhile, when priority is given to the discharge end time at the time of failure, that is, in order for the discharge end time to be within a predetermined value even though the discharge is performed in the MODE1 or the MODE2 during failure, the discharge end time t2 is calculated by using Equation (3) of the MODE2 having a longer discharge end time. The duty is decided such that the discharge end time t2 is within the predetermined value, and the operation is performed in the balanced type.

Figure 8:
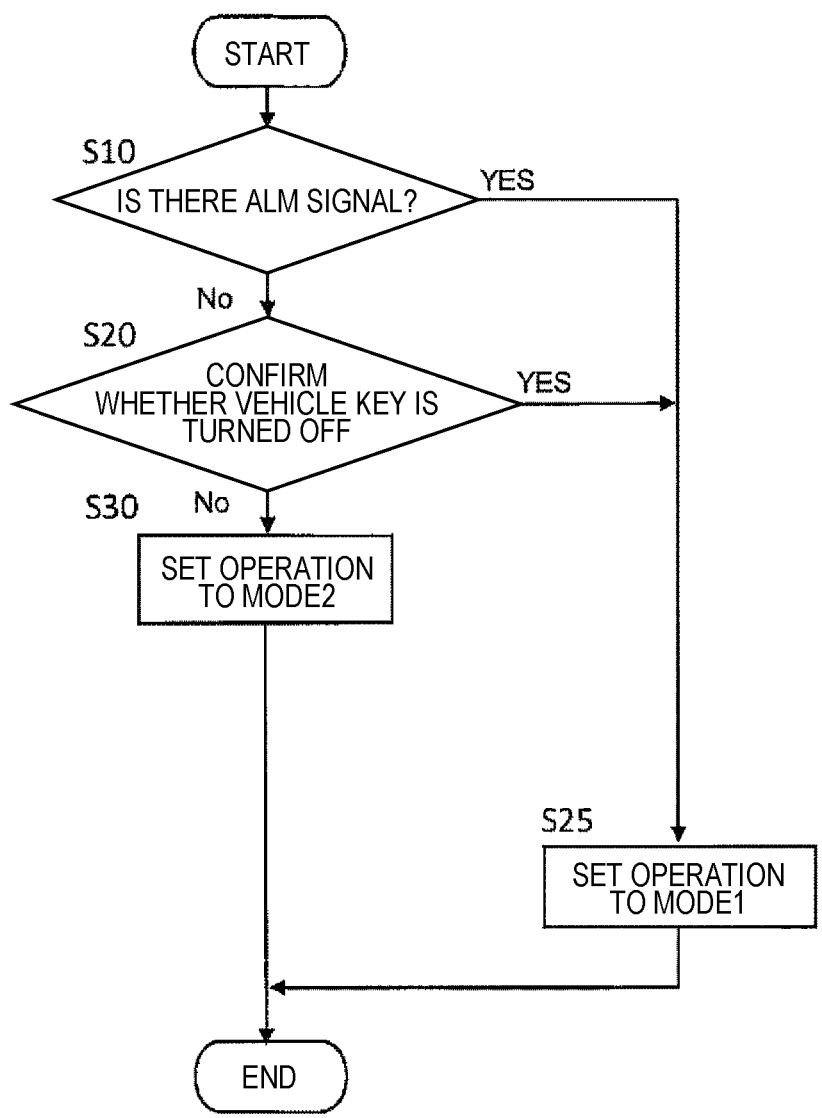
FIG. 8 is a diagram illustrating an operation example of a MODE1 rectangular wave signal and a MODE2 rectangular wave signal.

FIG. 8 is a flowchart for deciding which of the MODE1 and the MODE2 to perform the discharge when the motor controller 5 does not fail. FIG. 8 illustrates a case where the rapid type illustrated in FIG. 7 is adopted and the operation is performed based on an abnormal state (presence or absence of an ALM signal) and a vehicle key-off state. Although the description is omitted, the same operation is also performed when the balanced type is adopted.

In step S10, the motor controller 5 determines whether or not there is the ALM signal generated at the time of abnormality. The ALM signal is generated, for example, when a vehicle collision is detected. When the motor controller 5 determines in step S10 that there is the ALM signal, the processing proceeds to step S25, and the MODE1 is operated for the discharge. That is, the Low signal is output as the discharge control signal IN_A from the motor controller 5. In the truth table B of FIG. 3, when the discharge control signal IN_A is Low, since the rectangular wave signal IN_B is output from the logic circuit 20, the MODE1 rectangular wave signal is output as the output signal OUT, and the rapid discharge using the MODE1 rectangular wave signal is performed.

Meanwhile, in a case where it is determined in step S10 that there is no ALM signal, the processing proceeds to step S20. In step S20, the motor controller 5 determines the vehicle key-off state. In a case where it is determined in step S20 that the key is turned off, the processing proceeds to step S25, and the operation is set to the MODE1. That is, the rapid discharge using the MODE1 rectangular wave signal is performed. In a case where it is determined in step S20 that the key is not turned off, that is, in a case where the vehicle is in a key-on state, the processing proceeds to step S30, and the operation is set to the MODE2. Therefore, when an overdischarge situation occurs at the time of regenerative charging, slow discharge is performed by the MODE2 rectangular wave signal, and wasteful power consumption is prevented.

When the discharge in the MODE1 or the MODE2 illustrated in FIG. 7 is performed and the rapid discharge at the time of key-off is performed, the discharge of the MODE1 having a short discharge end time is performed. However, the rapid discharge of the MODE1 has a large inrush power, and a load applied to the discharge resistor 6 is large. Therefore, when such discharge is repeated, the influence on a lifespan of the discharge resistor 6 becomes a problem.

Hereinafter, a discharge pattern in consideration of the lifespan of the discharge resistor 6 will be described with reference to FIGS. 9 to 12. Specifically, an average discharge power is reduced by mixing the discharge in the MODE1 and the discharge in the MODE2. The inrush powers in the MODE1 and the MODE2 are expressed by the following Equations (4) and (5), respectively. In Equations (4) and (5), the voltage V is a voltage remaining in the voltage smoothing capacitor 2 when the MODE is switched.

$$\text{Pmode1} = (V^2/R) \times (\text{ton}/T) \quad (4)$$

$$\text{Pmode2} = (V^2/R) \times \{(T-\text{ton})/T\} \quad (5)$$

Figure 9:
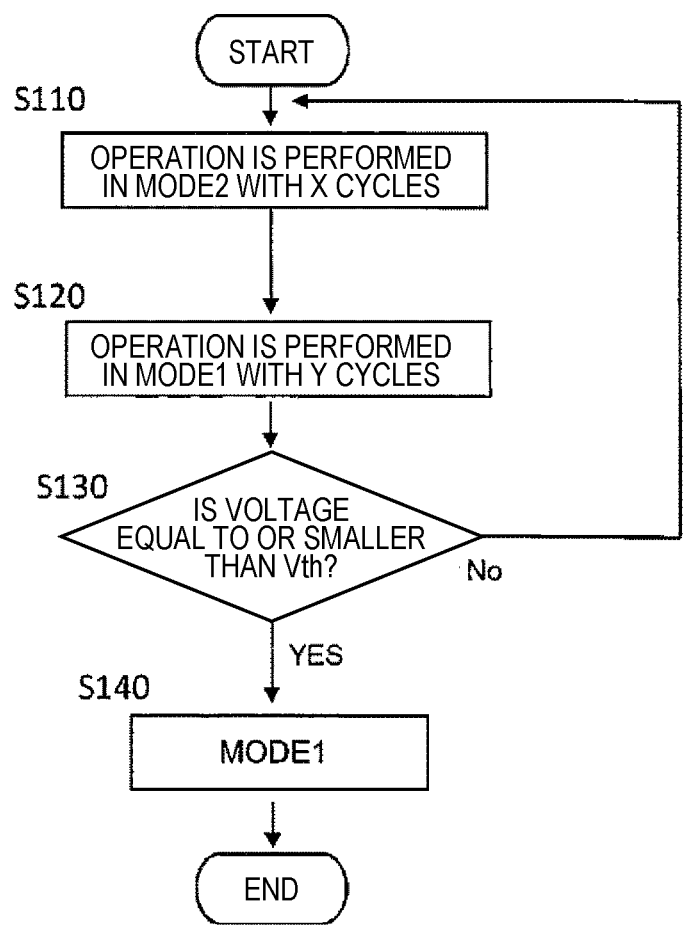
FIG. 9 is a flowchart illustrating an example of a discharge pattern when a rapid type is adopted.

FIG. 9 is a flowchart illustrating an example of a discharge pattern when the rapid type is adopted. In step S110, the discharge is started in the MODE2 having a long discharge end time, and the discharge in the MODE2 is performed with X cycles. In step S120, the MODE2 is switched to the MODE1 having a short discharge end time, and the discharge in the MODE1 is performed with Y cycles. In step S130, it is determined whether or not the voltage Vc of the voltage smoothing capacitor 2 drops to be equal to or smaller than a specified voltage value Vth. In a case where it is determined in step S130 that Vc≤Vth, the processing proceeds to step S140, and in a case where it is determined that Vc>Vth, the processing returns to step S110. In step S140, the discharge in the MODE1 is continued until the discharge ends.

The X cycle and the Y cycle are decided in consideration of the voltage drop of the voltage smoothing capacitor 2 (electrostatic capacitance C) per one cycle of the rectangular wave (after T seconds). A voltage V4 after one cycle when the discharge is performed at the constant resistance R is calculated by the following Equation (6), a voltage V5 after one cycle when the discharge in the MODE1 is calculated by the following Equation (7), and a voltage V6 after one cycle when the discharge is performed in the MODE2 is calculated by the following Equation (8). A voltage V3 is a voltage at the time of discharge start.

$$V4 = V3 \times \exp(-T/RC) \quad (6)$$

$$V5 = V4 \times (\text{ton}/T) \quad (7)$$

$$V6 = V4 \times \{(T-\text{ton})/T\} \quad (8)$$

The inrush power at the time of start can be smaller than that in the case of starting the discharge in the MODE1 by starting the discharge in the MODE2 as in steps S110 and S120 and then performing the discharge in the MODE1. Since the discharge in the MODE1 and the discharge in the MODE2 are alternately performed in a voltage region higher than the specified voltage value Vth, an average discharge power can be reduced as compared with a case where the discharge is performed only in the MODE1. Therefore, the influence on the lifespan of the discharge resistor 6 in a discharge start region can be reduced. In a case where the voltage Vc of the voltage smoothing capacitor 2 drops to the specified voltage value Vth, since the discharge power is small even in the MODE1, even though the discharge only in the MODE1 in step S140 is continued, the influence on the lifespan of the discharge resistor 6 is small.

Figure 10:
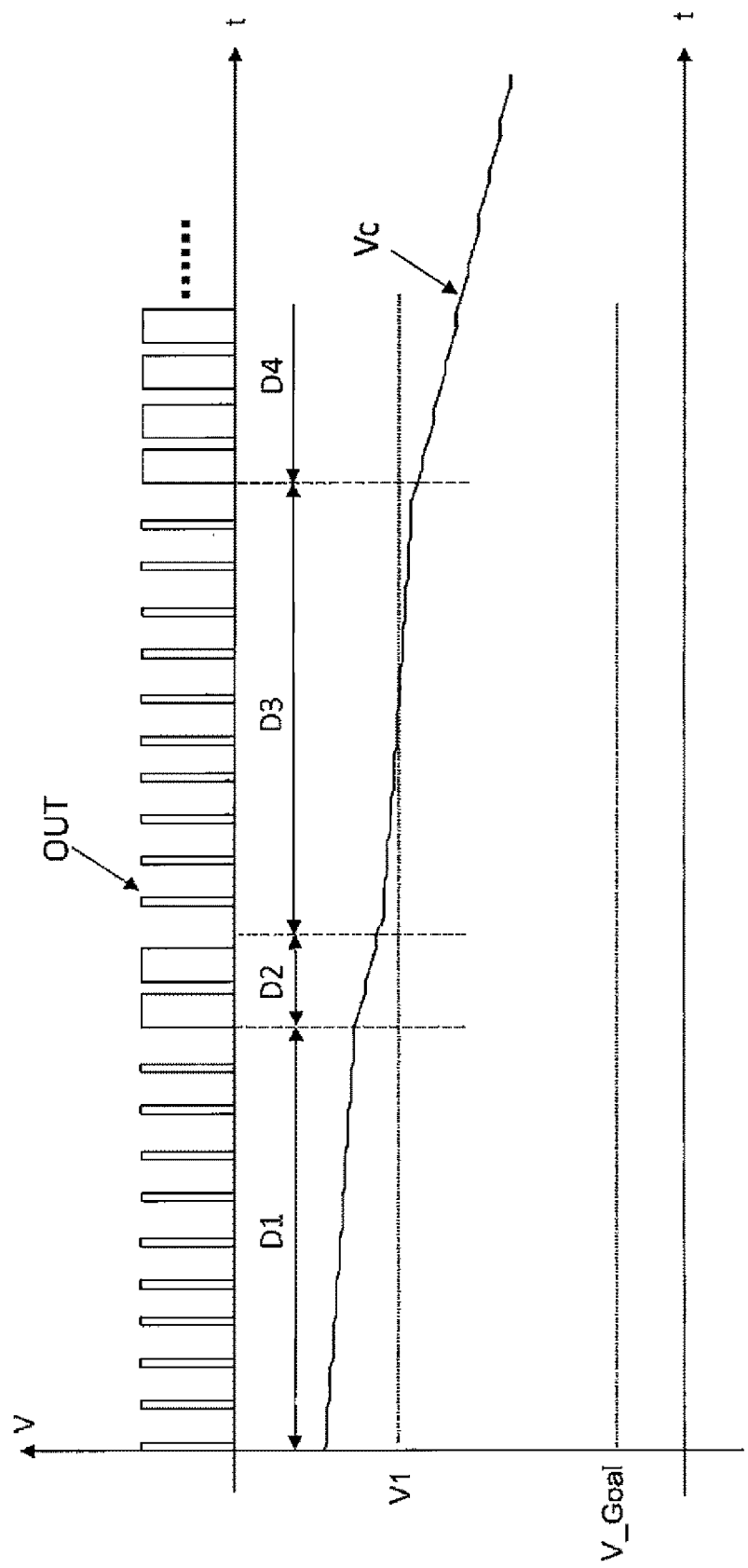
FIG. 10 is a diagram illustrating a signal waveform of an output signal OUT and a waveform of a voltage Vc when discharge is performed according to the control flow of FIG. 9.

FIG. 10 is a diagram illustrating a signal waveform of the output signal OUT of the logic circuit 20 and a waveform of the voltage Vc of the voltage smoothing capacitor 2 when the discharge is performed according to the control flow of FIG. 9. The discharge in the MODE2 is performed with ten cycles in a period D1 (step S110), the discharge in the MODE1 is performed with two cycles in a period D2 (step S120), and the voltage Vc of the voltage smoothing capacitor 2 is below the specified voltage value Vth the discharge in the MODE2 in a period D3. As a result, YES is determined in step S130 of FIG. 9, and the discharge in the MODE1 is performed in a period D4 (step S140).

Figure 11:
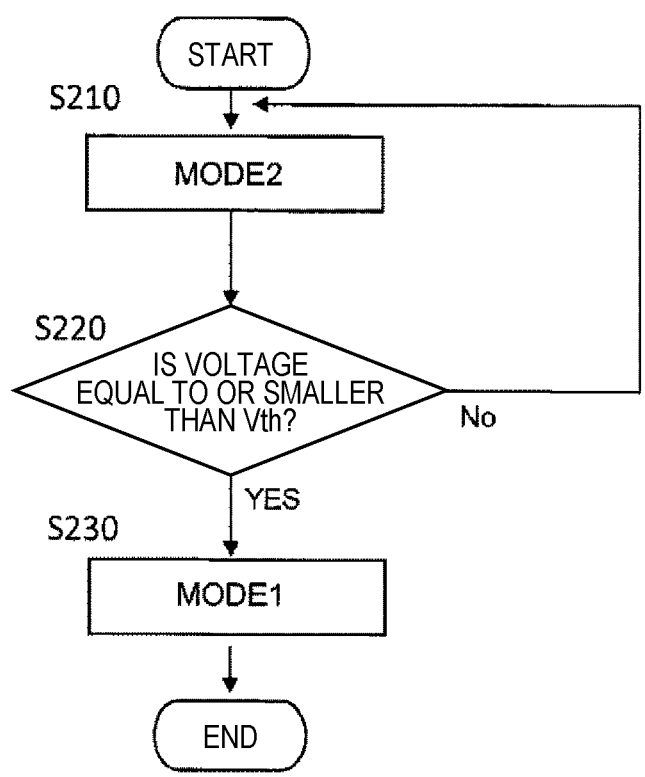
FIG. 11 is a flowchart illustrating an example of a discharge pattern when a balanced type is adopted.

FIG. 11 is a flowchart illustrating an example of a discharge pattern when the balanced type is adopted. In the case of the balanced type, a duty difference of the rectangular wave signal between the MODE1 and the MODE2 is small, and the duty of the MODE2 is about 40%. Therefore, even though the discharge is started only in the MODE2, the influence on the lifespan of the discharge resistor 6 can be suppressed, and a sufficient discharge rate can be achieved without alternately repeating the MODE2 and the MODE1 as in the rapid type.

Therefore, in a case where the discharge in the MODE2 is started in step S210, the discharge in the MODE2 is continued until the voltage Vc of the voltage smoothing capacitor 2 is determined to be Vc≤Vth with respect to the specified voltage value Vth in step S220. In a case where it is determined in step S220 that Vc≤Vth, the processing proceeds to step S230, and the discharge is switched to the MODE1. The discharge in the MODE1 is continued until the discharge ends.

Figure 12:
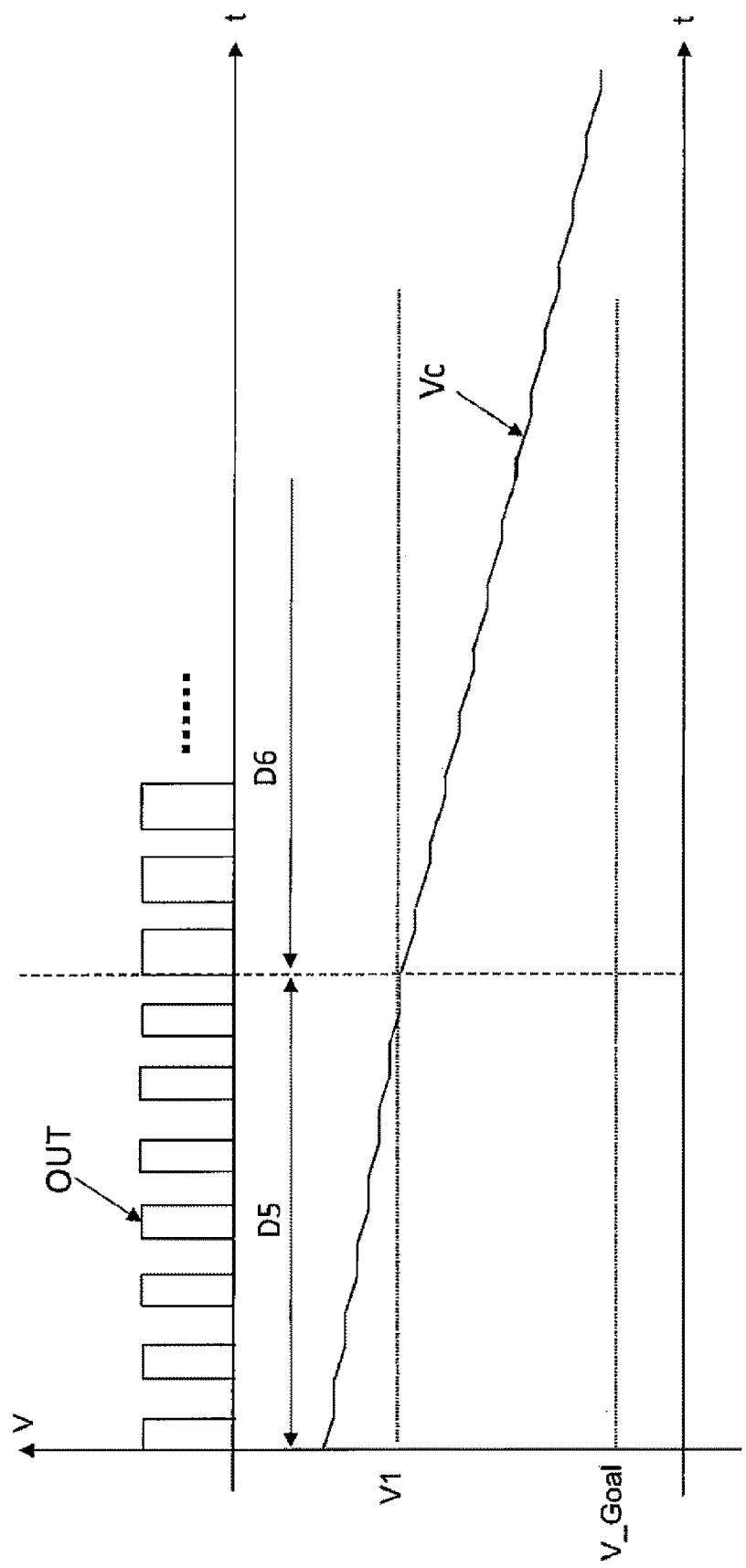
FIG. 12 is a diagram illustrating a signal waveform of an output signal OUT and a waveform of a voltage Vc when discharge is performed according to the control flow of FIG. 11.

FIG. 12 is a diagram illustrating a signal waveform of the output signal OUT of the logic circuit 20 and a waveform of the voltage Vc of the voltage smoothing capacitor 2 when the discharge is performed according to the control flow of FIG. 11. The discharge in the MODE2 is performed in a period D5 (step S210), and when the voltage Vc of the voltage smoothing capacitor 2 is equal to or lower than the specified voltage value Vth, the discharge in the MODE1 in a period D6 is started (step S230).

It has been described that the duty in the balanced type is set to about 60% for the MODE1 rectangular wave signal and is set to about 40% for the MODE2 rectangular wave signal. In the case of the balanced type, it is preferable that a difference between the duty of the MODE1 rectangular wave signal and the duty of the MODE2 rectangular wave signal is within a duty 20% such that a difference between the discharge speeds of the MODE1 and the MODE2 does not become too large.

Although it has been described in the examples illustrated in FIGS. 9 and 11 that the discharge is started in the MODE2 in order to reduce the influence of the inrush power, when the voltage Vc of the voltage smoothing capacitor 2 at the time of the discharge start satisfies Vc≤V1, the discharge may be started in the MODE1.

Although various embodiments and modification examples have been described above, the present invention is not limited to these contents. Other aspects considered within the scope of the technical idea of the present invention are also included within the scope of the present invention.

REFERENCE SIGNS LIST

1 DC battery
2 voltage smoothing capacitor
3, 7 switching element
5, 50 motor controller
6 discharge resistor
8, 80 discharge gate drive circuit
11 motor
14 three-phase inverter device
16 switching signal circuit unit
20 logic circuit
90 inverter circuit unit
100 power conversion device
161 triangular wave generation circuit
162 comparator

The invention claimed is:

1. A power conversion device comprising:
an inverter circuit unit that performs conversion between a DC power and an AC power;
a smoothing capacitor that is electrically connected in parallel to the inverter circuit unit;
a discharge resistor element that is electrically connected in parallel to the smoothing capacitor;
a switching element that is connected in series with the discharge resistor element to turn on and off a discharge current flowing through the discharge resistor element;
a controller circuit unit that selectively outputs a High-level signal and a Low-level signal as a discharge control signal instructing that discharge using the discharge resistor element is performed;
a signal generation circuit that outputs a first rectangular wave signal having a predetermined duty D; and
a logic circuit that outputs, as an on and off control signal, any one of a second rectangular wave signal having the same duty as the duty of the first rectangular wave signal and a third rectangular wave signal having a duty (1-D) to the switching element.

2. The power conversion device according to claim 1, wherein a difference between the duty of the second rectangular wave signal and the duty of the third rectangular wave signal is within a duty 20%.

3. The power conversion device according to claim 1, wherein the duty of the second rectangular wave signal is higher than the duty of the third rectangular wave signal,
the AC power from the inverter circuit unit is supplied to a motor winding, and
the controller circuit unit performs discharge using the motor winding when the third rectangular wave signal is output from the logic circuit.

4. The power conversion device according to claim 3, wherein the controller circuit unit outputs the discharge control signal for instructing that an operation of outputting the second rectangular wave signal only for a second predetermined time after outputting the third rectangular wave signal only for a first predetermined time is repeatedly executed.

5. The power conversion device according to claim 4, wherein the first predetermined time is set to a time corresponding to a plurality of cycles of the third rectangular wave signal, and the second predetermined time is set to a time corresponding to a plurality of cycles of the second rectangular wave signal.

6. The power conversion device according to claim 3, wherein the controller circuit unit outputs a first discharge control signal for instructing that the third rectangular wave signal is output, and outputs a second discharge control signal for instructing that the second rectangular wave signal is output when a voltage of the smoothing capacitor is equal to or smaller than a predetermined voltage after the discharge is started.

7. The power conversion device according to claim 3, wherein the controller circuit unit outputs the discharge control signal for instructing that the second rectangular wave signal is output when a voltage of the smoothing capacitor is equal to or smaller than a predetermined voltage after the discharge is started.

* * * * *